United States Patent
Chen et al.

(10) Patent No.: US 7,644,142 B2
(45) Date of Patent: Jan. 5, 2010

(54) METHODS AND APPARATUS TO PERFORM PROCESS PLACEMENT FOR DISTRIBUTED APPLICATIONS

(75) Inventors: Hu Chen, Beijing (CN); Wenguang Chen, Beijing (CN); Bob Kuhn, White Heath, IL (US); Eric Huang, Eden Prairi, MN (US)

(73) Assignee: Intel Corporation, Santa Clara, CA (US)

( * ) Notice: Subject to any disclaimer, the term of this patent is extended or adjusted under 35 U.S.C. 154(b) by 457 days.

(21) Appl. No.: 11/418,311

(22) Filed: May 4, 2006

(65) Prior Publication Data

US 2007/0260668 A1     Nov. 8, 2007

(51) Int. Cl.
    *G06F 15/177* (2006.01)
(52) U.S. Cl. .................. 709/220; 717/121; 715/853
(58) Field of Classification Search ......... 709/220–224; 717/121–133
    See application file for complete search history.

(56) References Cited

U.S. PATENT DOCUMENTS

| | | | |
|---|---|---|---|
| 6,381,628 B1 * | 4/2002 | Hunt ........................... | 709/201 |
| 7,174,370 B1 * | 2/2007 | Saini et al. .................. | 709/220 |
| 2005/0210133 A1 * | 9/2005 | Florissi et al. .............. | 709/224 |
| 2006/0031444 A1 * | 2/2006 | Drew et al. .................. | 709/223 |
| 2006/0101104 A1 * | 5/2006 | Bhanot et al. ................ | 708/105 |

OTHER PUBLICATIONS

"Implementing the MPI Process Topology Mechanism", Jesper Larsson Traff, Supercomputing 2002, (14 Pages).

"Communicating Efficiently on Cluster Based Grids with MPICH-VMI", Pant et al., Cluster 2004, pp. 23-34, (12 Pages).

"MagPie: MPI's Collective Communication Operations for Clustered Wide Area Systems", Kielmann et al., Aug. 1999, pp. 131-140 (10 Pages).

"A Survey of Graph Layout Problems", Diaz et al., ACM Computing Surveys, vol. 34, No. 3, Sep. 2002, pp. 313-356 (44 Pages).

"An Efficient K-Way Graph Partitioning Algorithm for Task Allocation in Parallel Computing Systems", Lee et al., 1990, pp. 748-781 (4 Pages).

"METIS Unstructured Graph Partitioning and Sparse Matrix Ordering system", Karypis et al., Aug. 26, 1995, (16 Pages).

"An Efficient Heuristic Procedure for Partitioning Graphs", Kernighan et al., The Bell System Technical Journal, Feb. 1970, pp. 291-307 (17 Pages).

"Task Allocation for Shared Clusters of SMPs", Weijian et al., Tsinghua Science and Technology, vol. 6, No. 1, 2001, (13 Pages).

"Multiway Partitioning with Pairwise Movement", Cong et al., Proceedings of ICCAD, pp. 512-516, 1998, (5 Pages).

(Continued)

*Primary Examiner*—Salad Abdullahi
(74) *Attorney, Agent, or Firm*—Hanley, Flight & Zimmerman, LLC

(57) ABSTRACT

Methods and apparatus to perform process placement for distributed applications are disclosed. An example method comprises determining a mapping between a communication graph representative of communications of a distributed application and a topology graph representative of communication costs associated with a computing network, and executing the distributed application with the processes of the distributed application assigned to the processing entities of the computing network based upon the mapping.

27 Claims, 5 Drawing Sheets

OTHER PUBLICATIONS

"A Mapping Strategy for Parallel Processing", Lee et al, IEEE Trans. On Computers, vol. C-36, No. 4, pp. 433-442, 1987, (10 Pages).

"A New Scheduling Strategy for NUMA Multiprocessor Systems", Lai et al., ICPADS 1996, pp. 222-229, (8 Pages).

"Heuristic Algorithms for Task Assignment in Distributed Systems", Virginia Mary Lo, IEEE Trans. On Computers, vol. C-37, No. 11, pp. 1384-1397, Nov. 1988, (14 Pages).

"Optimization by Simulated Annealing", Kirkpatrick et al., Science, vol. 220, pp. 671-680, May 1983, (10 Pages).

"A Hierarchical and Distributed Approach for Mapping Large Applications to Heterogeneous Grids Using Genetic Algorithms", Sanyal et al., Proceeding of the IEEE International Conference on Cluster Computing, 2003, (4 Pages).

"The Chaco User's Guide Version 1.0", Hendrickson et al., Oct. 1993, (23 Pages).

"Mesh Partitioning: A Multilevel Balancing and Refinement Algorithm", Walshaw et al., SIAM J. Scientific Computing, vol. 22, pp. 63-80, Jan 2000, (18 Pages).

"Graph Partitioning with the Party Library: Helpful-Sets in Practice", Monien et al., SBAC-PAD'04, 2004, pp. 198-205, (8 Pages).

"Intel® Trace Collector", www.intel.com/cd/software/products/asmo-na/eng/cluster/tanalyzer/index/htm, Jul. 21, 2005 (125 Pages).

"Intel® MPI Library 2.0", www.intel.com/cd/software/products/asmo-na/eng/cluster/mpi/index.htm, Downloaded Mar. 16, 2006, (2 Pages).

"Graph Partitioning and Parallel Solvers: Has the Emperor no Clothes?", Bruce Hendrickson, LNCS vol. 1457, pp. 218-225, Aug. 1998, (8 Pages).

"The NAS Parallel Benchmarks 2.0", Bailey et al., Technical Report NAS-95-010, NASA Ames Research Center, 1995, (24 Pages).

"Optimization and Scaling of Shared-Memory and Message-Passing Implementations of the Zeus Hydrodynamics Algorithm", Robert A. Fiedler, Proceeding of the SC97, 1997, (16 Pages).

"Chemistry at HARvard Macromolecular Mechanics", www.charm-m.org, Downloaded Mar. 16, 2006, (1 Page).

"MPICH-A Portable Implementation of MPI", www.unix.mcs.anl.gov/mpi/mpich, Downloaded Mar. 16, 2006, "States Released Nov. 4, 2005" (3 Pages).

"Effects of Communication Latency, Overhead, and Bandwidth in a cluster Architecture", Martin et al., Proceedings of the $24^{th}$ Annual International Symposium on Computer Architecture, Jun. 1997, (16 Pages).

"LS-DYNA", www.dynalook.com/home/nav_home.html, Downloaded Mar. 16, 2006, (2 Pages).

"The Weather Research & Forecasting Model", www.wrf-model.org/wrfadmin/publications.php, Downloaded Mar. 16, 2006, (3 Pages).

"Scali MPI Connect™ Function/Feature Description", www.scali.no/download/doc/Scali_MPI_Connect_FF-4_3_6_121104_EXT.pdf, Nov. 15, 2004 (16 Pages).

"LogP: Towards a Realistic Model of Parallel Computation", Culler et al., In $4^{th}$ ACM SIGPLAN symposium on Princples and Practice of Parallel Programming, pp. 262-273, 1993, (24 Pages).

"A Comparison of Eleven Static Heuristics for Mapping a Class of Independent Tasks onto Heterogeneous Distributed Computing Systems", Braun et al., Journal of Parallel and Distributed Computing, vol. 61 pp. 810-837, 2001, (28 Pages).

"An Efficient Algorithm for the Physical Mapping of Clustered Tasks Graphs onto Multiprocessor Architectures", Koziris et al., Proc. Of $8^{th}$ Euromicro Workshop on parallel and Distributed Processing, (PDP2000), 2000, IEEE Press, pp. 406-413, (8 Pages).

"MagPie: MPI's Collective Communication Operations for Clustered Wide Area Systems", Kielmann et al., PPoPP '99, 1999, (18 Pages).

"Scali MPI Connect an Introduction", www-csit.phy.cam.ac.uk/Cavendish/computing/cluster/scali/ScaliMPIConnect/smc-intro.pdf, Nov. 30, 2004, (24 Pages).

"Scali Optimizing Performance with Scali MPI Connect", www-csit.phy.cam.ac.uk/Cavendish/computing/cluster/scali/ScaliMPIConnect/usingmpi.pdf, Dec. 14, 2004 (28 Pages).

* cited by examiner

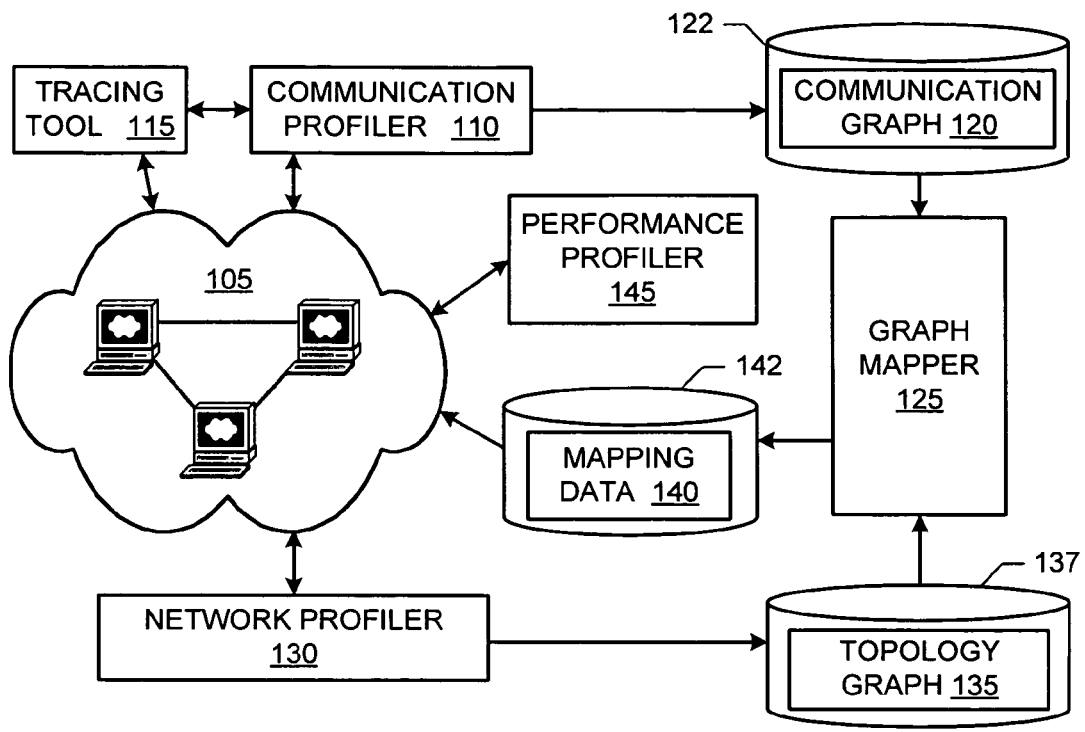
FIG. 1
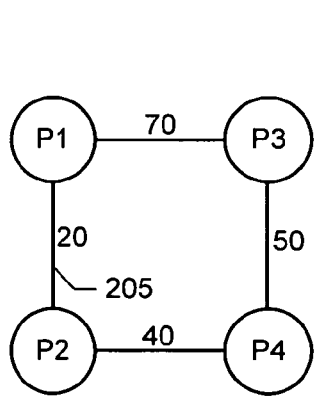
FIG. 2A
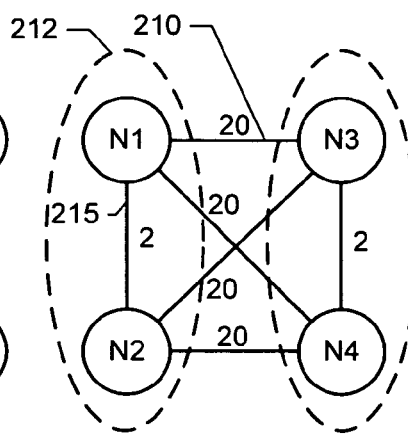
FIG. 2B
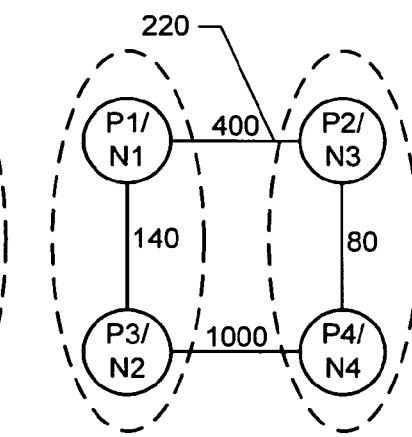
FIG. 2C
|    | P1 | P2 | P3 | P4 |
|----|----|----|----|----|
| P1 | 0  | 20 | 70 | 0  |
| P2 | 20 | 0  | 0  | 40 |
| P3 | 70 | 0  | 0  | 50 |
| P4 | 0  | 40 | 50 | 0  |
FIG. 3A
|    | N1 | N2 | N3 | N4 |
|----|----|----|----|----|
| N1 | 0  | 2  | 20 | 20 |
| N2 | 2  | 0  | 20 | 20 |
| N3 | 20 | 20 | 0  | 2  |
| N4 | 20 | 20 | 2  | 0  |
FIG. 3B

| APPLICATION | METRIC | DEFAULT | MAP | SPEEDUP |
|---|---|---|---|---|
| ZEUSMP | SECONDS | 2645 | 1579 | 1.7 |
| COMBUSTION | SECONDS | 297 | 278 | 1.1 |
| WRF | SECONDS | 584 | 583 | 1 |
| LU.A.16 | MFLOPS | 149 | 181 | 1.2 |
| BT.A.16 | MFLOPS | 140 | 150 | 1.1 |
| SP.A.16 | MFLOPS | 45 | 47 | 1.1 |
| MG.A.16 | MFLOPS | 72 | 108 | 1.5 |
| CG.A.16 | MFLOPS | 13 | 19 | 1.5 |

FIG. 6A

| APPLICATION | METRIC | DEFAULT | MAP | SPEEDUP |
|---|---|---|---|---|
| ZEUSMP | SECONDS | 5308 | 1573 | 3.3 |
| COMBUSTION | SECONDS | 1498 | 1498 | 5.4 |
| WRF | SECONDS | 609 | 277 | 1 |
| LU.A.16 | MFLOPS | 138 | 589 | 1.4 |
| BT.A.16 | MFLOPS | 104 | 192 | 1.2 |
| SP.A.16 | MFLOPS | 33 | 39 | 1.2 |
| MG.A.16 | MFLOPS | 65 | 81 | 1.3 |
| CG.A.16 | MFLOPS | 9 | 16 | 1.8 |

METHODS AND APPARATUS TO PERFORM PROCESS PLACEMENT FOR DISTRIBUTED APPLICATIONS

FIELD OF THE DISCLOSURE

This disclosure relates generally to distributed applications and, more particularly, to methods and apparatus to perform process placement for distributed applications.

BACKGROUND

A message-passing parallel application (i.e., a distributed application) is cooperatively implemented via generally contemporaneous execution of two or more machine accessible instructions (e.g., processes) by one or more processors and/or cores. A distributed application often has a non-uniform number of messages and/or data to be communicated between the two or more of processes that collectively implement the distributed application.

Symmetric Multi-Processor (SMP) clusters, multi-clusters and/or computing networks are commonly used to execute and/or implement distributed applications. Such computing networks often have non-uniform communication costs associated with the transmission of messages and/or data between the processors, cores and/or computing nodes that form the computing network. For instance, an example computing node contains multiple processors and/or cores and has high bandwidth and/or low latency (i.e., low communication cost) communication paths that connect the processors and/or cores. However, communication paths between processors and/or cores of this example computing node and another processor and/or core associated with any other computing node may have substantially lower bandwidth and/or substantially higher latency (i.e., a higher communication cost). For example, messages and/or data passed between two computing nodes may traverse through multiple Ethernet switches and/or communication links and, thus, exhibit relatively higher latency and/or lower bandwidth.

Given the non-uniformity of communication requirements for a distributed application and the non-uniformity of communication costs for a computing network, the assignment of processes of a distributed application to processors, cores and/or computing nodes of a computing network has a direct and/or potentially significant impact on the performance (e.g., execution speed) of the distributed application.

BRIEF DESCRIPTION OF THE DRAWINGS

FIG. 1 is a schematic illustration of an example apparatus to perform process placement for distributed applications.

FIGS. 2A, 2B and 2C illustrate an example mapping of a communication graph to a topology graph.

FIGS. 3A and 3B illustrate example data structures to store a communication graph and a topology graph, respectively.

FIGS. 6A and 6B illustrate example distributed application performance improvements for the example computing networks of FIGS. 5A and 5B, respectively.

DETAILED DESCRIPTION

Figure 4:
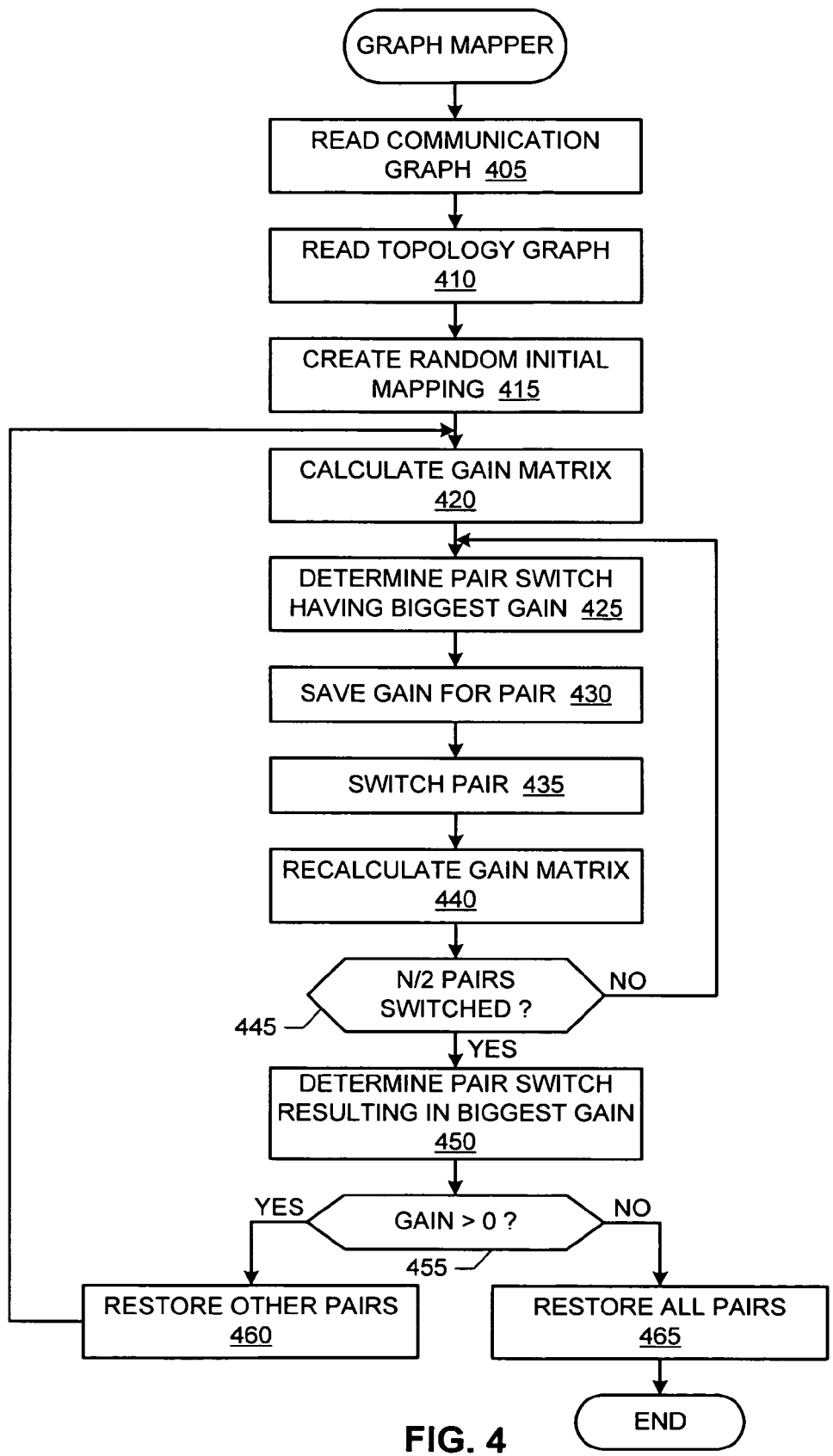
FIG. 4 is a flowchart representative of example machine accessible instructions which may be executed to implement the example graph mapper of FIG. 1.

FIG. 1 is a schematic illustration of an example system to perform process mapping for one or more distributed applications. In the example system of FIG. 1, an example distributed application is cooperatively implemented via generally contemporaneous execution of machine accessible instructions by two or more processors and/or cores of a computing network 105. For example, a first process (e.g., a software application or portion of a software application) executed by a first processor and/or core, a second process executed by a second processor and/or core, a third process executed by a third processor and/or core, etc. cooperatively realize a distributed application using any variety of distributed computing algorithms, techniques and/or methods. The various processes of a distributed application may implement different, similar and/or identical machine accessible instructions. Moreover, more than one process may be implemented by any particular processor and/or core. Further, any number of processors and/or cores (e.g., 2, 3, 4, etc.) may be used to execute a distributed application.

In the example system of FIG. 1, one or more processors and/or cores are implemented within a computing node (e.g., a dual-processor and/or dual-core computer, server and/or workstation) with a plurality of computing nodes forming the example computing network 105. For simplicity, the term processing entity will be used herein to refer to processors, cores and/or computing nodes. The processes of a distributed application may be developed using any variety of programming tool(s) and/or language(s) and may be used to implement any variety of distributed application(s). Further, example processing entities of the example computing network 105 of FIG. 1 may execute any variety of operating system(s). It will be readily appreciated by persons of ordinary skill in the art that the methods and apparatus to perform process mapping disclosed herein may be applied to any type, topology and/or size of computing networks 105 and/or to any variety of distributed applications.

To characterize the communication requirements for an example distributed application, the example system of FIG. 1 includes a communication profiler 110. Example communication requirements include a number of messages, a number of bytes, etc. sent between any two of the processes implementing the example distributed application for, for example, a representative time period, function(s), etc. In the illustrated example of FIG. 1, the example communication profiler 110 profiles the communication requirements of the example distributed application while the distributed application is executing on the example computing network 105. Using any variety of method(s), technique(s), application programming interface(s) and/or user interfaces(s), the communication profiler 110 analyzes trace information collected by any variety of tracing tool 115 such as, for example, the Intel® Trace Analyzer and Collector or the Intel® message passing interface (MPI) library. Alternatively, the example communication profiler 110 may characterize the distributed application by analyzing the source code of the distributed application and/or by relying on information and/or parameters provided by, for example, a programmer of the distributed application.

It will be readily apparent to persons of ordinary skill in the art that the communication requirements for a distributed application may vary. That is, the communication requirements for a first portion of a distributed application may be different than those for a second portion. As such, the example communication profiler 110 of FIG. 1 may be used to profile all or any portion of a distributed application. For example, the communication profiler 110 may be used to profile a portion representing the substantially largest communication needs and/or computational processing. The communication profiler 110 may also be used to profile an entire distributed application and, thus, the communication requirements represent a sort of overall average of the communication requirements. Moreover, if a distributed application is modified (e.g., changed number of processes, application is scaled, re-distribution of workload amongst the processes, etc.), its communication requirements may change and, thus, it may be required, desired and/or beneficial for the communication profiler 110 to re-determine the communication requirements for the modified distributed application.

The example communication profiler 110 of FIG. 1 compiles the communication requirements into a communication graph 120 having a plurality of graph edges that represents the communication requirements between each pair of the processes that implement the example distributed application. In the example of FIG. 1, the example communication graph 120 is stored as, for example, a data structure (e.g., a matrix, an array, variable(s), register(s), a data table, etc.) in, for example, a memory and/or a machine accessible file 122 that is accessible to a graph mapper 125. An example data structure to store a communication graph 120 is discussed below in connection with FIG. 2A.

To characterize the communication costs associated with the example computing network 105, the example system of FIG. 1 includes a network profiler 130. Example communication costs include a maximum bandwidth, a latency (e.g., microsecond per kilo byte (Kbyte)), an overhead, etc. between each pair of the processing entities (e.g., processors, cores, computing nodes, etc.) that implement the example computing network 105. The example network profiler 130 of FIG. 1 profiles the communication costs of the example computing network 105 using any variety of topology discovery mechanism(s), method(s) and/or technique(s) such as, for example, any variety and/or combination of a message-passing parallel ping-pong tool, a trace collector and/or an MPI library. For example, a trace collector could be used to characterize a message-passing parallel ping-pong tool, thus, discovering the topology of a computing network. For example, outputs of the message-passing parallel ping-pong tool could be used to directly characterize the communication costs associated with the topology. Additionally or alternatively, the example network profiler 130 of FIG. 1 could characterize the communication costs based upon a priori information regarding the communication device(s), communication paths and/or communication links used to connect the processing entities of the example computing network 105. Example a priori information includes a bus transfer speed, the delay and/or latency through an Ethernet and/or ATM switch, etc.

It will be readily apparent to persons of ordinary skill in the art that if the size, topology, etc. of the example computing network 105 is altered, changed and/or, otherwise modified, its communication costs may change and, thus, it may be desired and/or beneficial for the network profiler 130 to re-determine the communication costs for the modified computing network 105. Moreover, the communication costs may change over time depending on, for example, whether and/or how other distributed application(s), processes, jobs, etc. are running and/or scheduled on the example computing network 105.

The example network profiler 130 of FIG. 1 compiles the communication costs into a topology graph 135 having a plurality of graph edges that represents the communication requirements between each pair of the processing entities that implement the example computing network 105. In the example of FIG. 1, the example topology graph 135 is stored as, for example, a data structure (e.g., a matrix, an array, variable(s), register(s), a data table, etc.) in, for example, a memory and/or a machine accessible file 137 that is accessible to the graph mapper 125. An example data structure to store a communication graph 135 is discussed below in connection with FIG. 2B.

To determine a mapping between processes of an example distributed application and processing entities of the example computing network 105, the example system of FIG. 1 includes the graph mapper 125. The example graph mapper 125 of FIG. 1 determines a mapping of the vertices of the communication graph 120 for the example distributed application to the vertices of the topology graph 135 for the computing network 105 that reduces the total and/or overall communication cost for the example distributed application. In the illustrated example of FIG. 1, for a particular mapping of processes (i.e., nodes of the communication graph 120) to processing entities (i.e., nodes of the topology graph 135), the total and/or overall communication cost of a distributed application is computed as the sum of the costs associated with each of the edges resulting from a particular mapping. The example graph mapper 125 uses, for example, a linear matrix M that is indexed with the numbers of processes to represent the mapping between processes and processing entities. An example matrix M=[1, 3, 2, 4] corresponds to the example mapping illustrated and discussed below in connection with FIG. 2C. For purposes of explanation, a linear matrix M will be used herein, however, persons of ordinary skill in the art will readily recognize that any other variety of data structure, array, matrix, variable(s), register(s) and/or table could be used to represent a mapping between processes and processing entities.

In the example system of FIG. 1, the cost of a resulting mapped edge is computed using any variety of method(s) and/or technique(s) such as, for example, multiplying the associated communication requirements and communication costs. The example graph mapper 125 of FIG. 1 locates a mapping that reduces the sum of these resulting map edge costs. In particular, the example graph mapper 125 locates a mapping that representing a minima of the following mathematical expression:

$$\Sigma f(w_{ij}, d_{kl}), \qquad \text{EQN. 1}$$

where $w_{ij}$ is the communication graph edge value between processes i and j, $d_{k,l}$ is the topology graph edge value between processing entities k and l, where k=M[i] and l=M[j], and f( ), for example, is a function that multiples the two values $w_{ij}$ and $d_{k,l}$.

Starting with an initial random mapping M, the example graph mapper 125 sequentially considers alternative mappings. In particular, the example graph mapper 125 of FIG. 1 considers alternative mappings that result from a switch of the mapping of two processes. For example, if a first mapping maps processes i and j to processing entities M[i] and M[j], respectively, an example alternative mapping maps processes i and j to processing entities M[j] and M[i], respectively. The improvement and/or decrements (i.e., gain) resulting from such a mapping switch can be computed as a difference of the value of the mathematical expression of EQN. 1 before and after the considered pair switch. In particular, components gain(i,j) of a gain matrix that represents the swapping of all pairs of processes i and j can be computed using the following mathematical expression:

$$\text{gain}(i,j) = \sum_{m \neq i,j} \begin{pmatrix} f(w_{i,m}, d_{M[i], M[m]}) + \\ f(w_{j,m}, d_{M[j], M[m]}) \end{pmatrix} - \sum_{m \neq i,j} \begin{pmatrix} f(w_{i,m}, d_{M[j], M[m]}) + \\ f(w_{j,m}, d_{M[i], M[m]}) \end{pmatrix} \quad \text{EQN. 2}$$

Starting with an initial random mapping M, the example graph mapper 125 uses the following process to locate the lowest overall cost mapping of processes to processing entities. The example graph mapper 125 first computes the gain matrix using EQN. 2 and then selects a process pair swap that results in the largest gain (i.e., the maximum gain matrix entry) and has processes that have not yet been swapped. The example graph mapper 125 saves the gain matrix entry (i.e., the gain that would result from a swap of the selected process pair) and then recalculates the entire gain matrix to model the mapping if the process swap was made. The example graph mapper 125 continues selecting process pairs to swap and re-computing the gain matrix until all of the pairs of the processes of the distributed application (i.e., vertices of the communication graph 120) have been swapped. The example graph mapper 125 then determines which of the pair swaps resulted in the largest saved gain. The pair swap providing the largest saved gain is retained and all others swaps are discarded. The example graph mapper 125 repeats the process described above until no additional swaps can be identified that result in an improvement to the overall communication cost for the distributed application (i.e., a local minima has been identified). As discussed below, to reduce the likelihood of finding a local minima, as opposed to an overall minima, the process may be repeated starting from one or more additional random mappings and then selecting the result that provides the lowest overall communication cost.

In the illustrated example of FIG. 1, the number of processes of the distributed application and the number of processing entities of the example computing network 105 are equal. If the number of processes is not equal to the number of processing entities then dummy vertices can be inserted into the smaller of the communication graph or the topology graph to equalize the sizes of the matrices.

The example graph mapper 125 of FIG. 1 stores the resulting graph mapping 140 into any variety of data structure (e.g., a matrix, an array, variable(s), register(s), a data table, etc.) in, for example, a memory and/or a machine accessible file 142 that is accessible to any variety of software entity and/or tool associated with and/or a part of the example computing network 105 that is responsible for setup and initialization of a distributed application. In the example of FIG. 1, the mapping data 140 is simply a list associating particular processes of the distributed application with particular processing entities of the example computing network 105. In the example of FIG. 1, the Intel® Cluster Toolkit is used to read the mapping data 140 and to setup and/or initialize the distributed application based upon the mapping of processes to processing entities determined by the example graph mapper 125.

It will be readily apparent to persons of ordinary skill in the art that the memories and/or machine accessible files 122, 137 and/or 142 may be implemented using any number of memories and/or machine accessible files. For example, a single memory may be used to store the communication graph 120, the topology graph 135 and the mapping data 140.

To measure the performance of a distributed application, the example system of FIG. 1 includes any variety of performance profiler 145. Using any variety of technique(s) and/or method(s), the example performance profiler 145 of FIG. 1 determines the execution speed (e.g., in seconds) and/or bandwidth (e.g., Mega-flops per second) of the distributed application. For example, the performance profiler 145 may be used to measure the performance improvement of a distributed application resulting from a process to processing entity mapping.

Although an example system to map processes of a distributed application to processing entities of a computing network 105 and to execute the distributed application based on the mapping has been illustrated in FIG. 1, distributed application systems may be implemented using any of a variety of alternative and/or additional devices, entities, modules, etc. Further, the devices, entities, modules, elements, etc. illustrated in FIG. 1 may be combined, re-arranged, and/or implemented in any of a variety of ways. For example, the communication profiler 110 and tracing tool 115 may be implemented using a single computing device and/or platform. Further still, any or all of the example tracing tool 115, the example communication profiler 110, the example graph mapper 125, the example network profiler 130 and/or the example performance profiler 145 may be implemented by hardware, software, firmware and/or any combination of hardware, software and/or firmware.

FIG. 2A illustrates an example communication graph 120 for an example distributed application. The example distributed application of FIG. 2A includes of four (4) processes P1, P2, P3 and P4 that form the vertices of the example communication graph 120 of FIG. 2A. The numbers associated with the graph edges illustrated in FIG. 2A represent the communication requirements between the two processes at either end of the graph edge. An example graph edge 205 between processes P1 and P2 requires 20 units of communication (e.g., messages and/or bytes). Alternatively or additionally, the communication requirements associated with each communication graph edge may represent, for example, a transmission and/or delay time that does not undesirably slow execution of the distributed application. In the example system of FIG. 1, communication requirements are inversely proportional delay times. For example, a short delay time corresponds to a large communication requirement. In the illustrated example of FIG. 2A, there are no communication requirements between processes P2 and P3 or between processes P1 and P4.

FIG. 2B illustrates an example topology graph 135 for an example computing network 105. The example computing network 105 of FIG. 2B includes of four (4) processing entities (e.g., cores) N1, N2, N3 and N4 that form the vertices of the example topology graph 135 of FIG. 2B. The numbers associated with the graph edges illustrated in FIG. 2B represent the communication costs between the two cores at either end of the graph edge. An example graph edge 210 between cores N1 and N3 represents a latency of 20 units of time (e.g., seconds). Alternatively or additionally, the communication costs associated with each topology graph edge may represent, for example, a bandwidth (e.g., bytes per second) associated with the corresponding processing entity pair, a latency (i.e., delay in communication), etc. Since, in the example of FIG. 2A, cores N1 and N2 are implemented within a single computing node 212 (e.g., within a single semiconductor package), the latency 215 between them is lower than, for example, the latency 210 between the cores N1 and N3 that are implemented in separate semiconductor packages and/or computing nodes.

FIG. 2C illustrates an example mapping of the example communication graph 120 of FIG. 2A to the topology graph 135 of FIG. 2B that reduces the overall distributed application communication cost computed using, for example, EQN. 1. The example graph mapper 125 of FIG. 1 determines the example mapping of FIG. 2C by executing, for example, the machine accessible instructions discussed below in connection with FIG. 4. As illustrated in FIG. 2C, process P1 is mapped to core N1, process P2 is mapped to core N3, process P3 is mapped to core N2 and process P4 is mapped to core N4. The numbers associated with the graph edges of FIG. 2C represent the resulting communication cost between the two mapped processes at either end of the graph edge. An example graph edge 220 between process P1 mapped to core N1 and process P2 mapped to core N3 represents a communication cost equal to the product of the communication requirement 205 of FIG. 2A and the communication cost 210 of FIG. 2B.

While the methods disclosed herein do not directly identify deficiencies and/or beneficial changes to a computing network, the resulting communication costs (e.g., the edges of FIG. 2C) associated with the mapping of a communication graph (e.g., FIG. 2A) to a topology graph (e.g., FIG. 2B) may be used by, for example, a programmer and/or analysis program and/or process to identify one or more ways that a computing network and/or distributed application could be alternated, changed, enhanced to improve the performance of the mapped distributed application. For example, the resulting communication costs could be used to determine the benefit of adding additional process(es), additional processing entity(ies), additional communication link(s), etc. Moreover, the methods disclosed herein could, additionally or alternatively, be used to evaluate and/or characterize possible performance and/or communication improvements resulting from a change in a distributed application and/or computing network.

FIG. 3A is an example matrix (i.e., a data structure) that represents the example communication graph 120 of FIG. 2A. The example matrix is a square matrix with each of the process nodes P1, P2, P3 and P4 of FIG. 2A corresponding to both a row and a column of the example data matrix. An example entry 305 in the $1^{st}$ row (corresponding to process P1) and $2^{nd}$ column (corresponding to process P2) corresponds to the communication requirement 205 between processes P1 and P2 of FIG. 2A. While the example data matrix of FIG. 3A is used to represent the example communication graph 120 of FIG. 2A, persons of ordinary skill in the art will readily recognize that any other variety of data structure, array, matrix, variable(s), register(s) and/or table could be used to represent a communication graph.

FIG. 3B is an example matrix (i.e., a data structure) that represents the example topology graph 135 of FIG. 2B. The example matrix is a square matrix with each of the cores N1, N2, N3 and N4 of FIG. 2B corresponding to both a row and a column of the example data matrix. An example entry 310 in the $2^{nd}$ row (corresponding to core N2) and $4^{th}$ column (corresponding to core N4) corresponds to the communication cost between cores N2 and N4 of FIG. 2B. While the example data matrix of FIG. 3B is used to represent the example topology graph 135 of FIG. 2B, persons of ordinary skill in the art will readily recognize that any other variety of data structure, array, matrix, variable(s), register(s) and/or table could be used to represent a topology graph.

FIG. 4 is a flowchart representative of example machine accessible instructions that may be executed to implement the example graph mapper 125 of FIG. 1. The example machine accessible instructions of FIG. 4 may be executed by a processor, a core, a controller and/or any other suitable processing device. For example, the example machine accessible instructions of FIG. 4 may be embodied in coded instructions stored on a tangible medium such as a flash memory, or random access memory (RAM) associated with a processor (e.g., the processor 710 shown in the example processor platform 700 and discussed below in conjunction with FIG. 7). Alternatively, some or all of the example flowchart of FIG. 4 may be implemented using an application specific integrated circuit (ASIC), a programmable logic device (PLD), a field programmable logic device (FPLD), discrete logic, hardware, firmware, etc. Also, some or all of the example flowchart of FIG. 4 may be implemented manually or as combination(s) of any of the foregoing techniques, for example, a combination of firmware, software and/or hardware. Further, although the example machine accessible instructions of FIG. 4 are described with reference to the flowchart of FIG. 4, persons of ordinary skill in the art will readily appreciate that many other methods of implementing the example graph mapper 125 of FIG. 1 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIG. 4 may be carried out sequentially and/or carried out in parallel by, for example, separate processing threads, processors, devices, circuits, etc. Moreover, the machine accessible instructions of FIG. 4 may be carried out, for example, in parallel with any other variety of processes, while the distributed application is executing, etc.

The example machine accessible instructions of FIG. 4 begin with the graph mapper 125 reading and/or accessing the communication graph 120 for a particular distributed application (block 405) and reading and/or accessing the topology graph 135 for a particular computing network 105 to which the distributed application is to be mapped (block 410). To increase the likelihood of locating the best solution, as opposed to a local minimum, the graph mapper 125 creates an initial random mapping M of the processes to the processing entities (block 415).

The graph mapper 125 then calculates the entries of a gain matrix for the initial mapping using, for example, the mathematical expression of EQN. 2 (block 420). The graph mapper 125 then locates the matrix entry having the largest value and not corresponding to a process that has already been temporarily swapped (block 425). The graph mapper 125 saves the identified matrix entry (i.e., the gain that would result if the processes were swapped) (block 430) and temporarily swaps the corresponding entries in the mapping matrix M (block 435). The graph mapper 125 then recalculates all of the entries of the gain matrix using, for example, the mathematical expression of EQN. 2 (block 440). If not all processes have been temporarily swapped (block 445), control returns to block 425 to locate the matrix entry having the largest value and not corresponding to a process that has been temporarily swapped.

When all processes have been temporarily swapped (block 445), based on the matrix entries saved at block 430 (i.e., gains for each of the temporary process swaps), the graph mapper 125 determines which process mapping swap resulted in the largest gain (block 450). If the gain due to the selected swap is positive (block 455), the graph mapper 125 discards all of the temporary process swaps except for the swap having the largest saved gain (block 460). That is the graph mapper 125 changes back the changes temporarily made to the mapping M while retaining the swap having the largest gain. Control then returns to block 420 to repeat the process. If the gain due to the selected swap is less than or equal to zero (block 455), the graph mapper 125 discards all of the temporary process swaps since the prior mapping already represented a local minima. The example machine accessible instructions of FIG. 4 are then ended.

Alternatively, after block 465 the example graph mapper 125 could save the current mapping and control could then return to block 415 to locate another mapping starting from another initial random mapping. The better of the two mappings (i.e., the mapping providing the lowest overall communication cost) could then be selected. The graph mapper 125 could repeat this process to determine any number of candidate mappings using any number of initial mappings. For example, all possible mappings could be tested, in which case, the initial mapping need not be random.

Figure 5A:
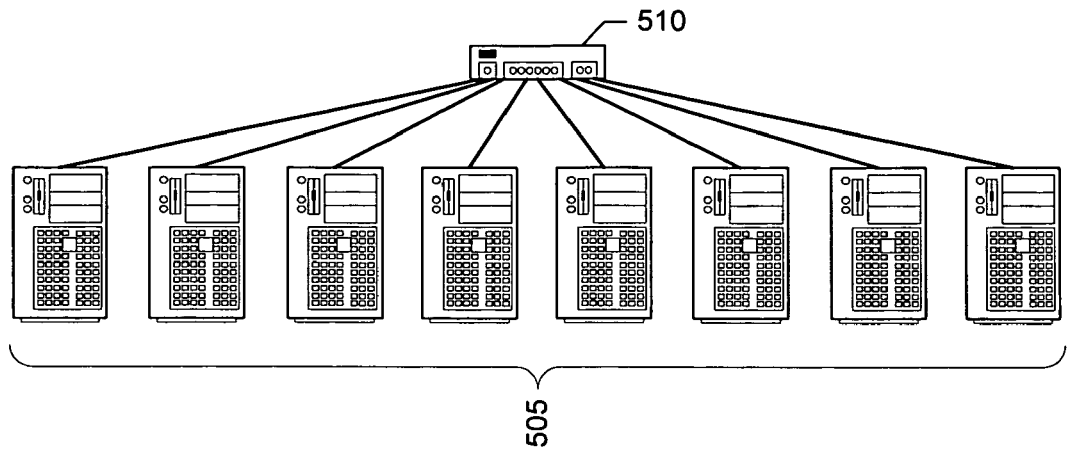
FIGS. 5A and 5B respectively illustrate example two-tier and three-tier computing networks.

FIG. 5A illustrates an example two-tier computing network 105 including of eight (8) computing nodes 505 that are communicatively coupled via an Ethernet switch 510. Each of the example computing nodes 505 of FIG. 5A include two processors and/or cores. In the example of FIG. 5A, there will be a substantially higher communication costs for communications between computing nodes 505 than between processors and/or cores within a given computing node 505.

Figure 5B:
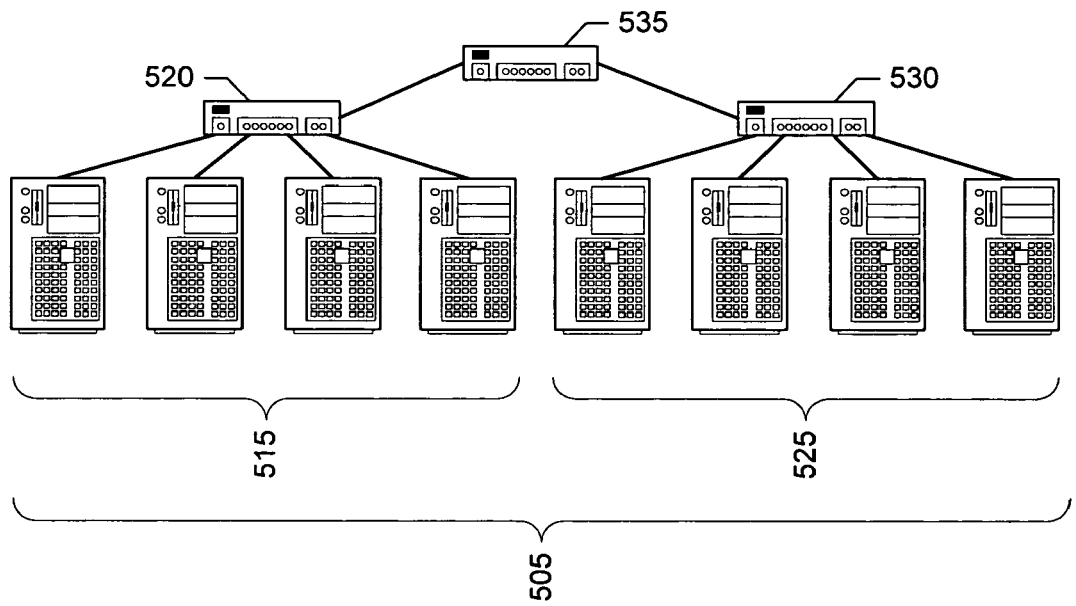

FIG. 5B illustrates an example three-tier computing network 105 including of the eight (8) computing nodes 505 of FIG. 5A. In contrast to FIG. 5A, the computing nodes 505 are communicatively coupled via two levels of Ethernet switches in the example of FIG. 5B. A first set of four (4) of the computing nodes 515 are communicatively coupled to a first Ethernet switch 520, while a second set of four (4) of the computing nodes 525 are communicatively coupled to a second Ethernet switch 530. The Ethernet switches 520 and 530 are communicatively coupled via a third Ethernet switch 535. In the illustrated example of FIG. 5B, communication cost increase as messages and/or data pass between additional Ethernet switches. For example, the communication cost between two computing nodes attached to the same Ethernet switch (e.g., two nodes in the subset 515) will be lower than the communication cost for data that has to pass through all three (3) Ethernet switches 520, 530 and 535 (e.g., between a node of the subset 515 and a node of the subset 525).

FIGS. 6A and 6B illustrate performance improvements resulting from the graph mapping methods and apparatus described above for a variety of industry-standard benchmark distributed applications 605. FIG. 6A illustrates the performance 610 resulting from a default mapping of processes to processors and/or cores for the example two-tier computing network 105 of FIG. 5A for each of the applications 605. Also illustrated in FIG. 6A is the performance 615 and speedup 620 that result when the processes of the distributed applications 605 are mapped to processors and/or cores of the two-tier network of FIG. 5A via the example process of FIG. 4 to reduce the overall communication costs of the distributed application. Likewise, FIG. 6B illustrates the performance 625 resulting from a default mapping of processes to processors and/or cores for the example three-tier computing network 105 of FIG. 5B. Also illustrated in FIG. 6B is the performance 630 and speedup 635 that result when the processes of the distributed applications 605 are mapped to processors and/or cores of the three-tier example network of FIG. 5B via the example process of FIG. 4 to reduce the overall communication costs of the distributed application.

Figure 7:
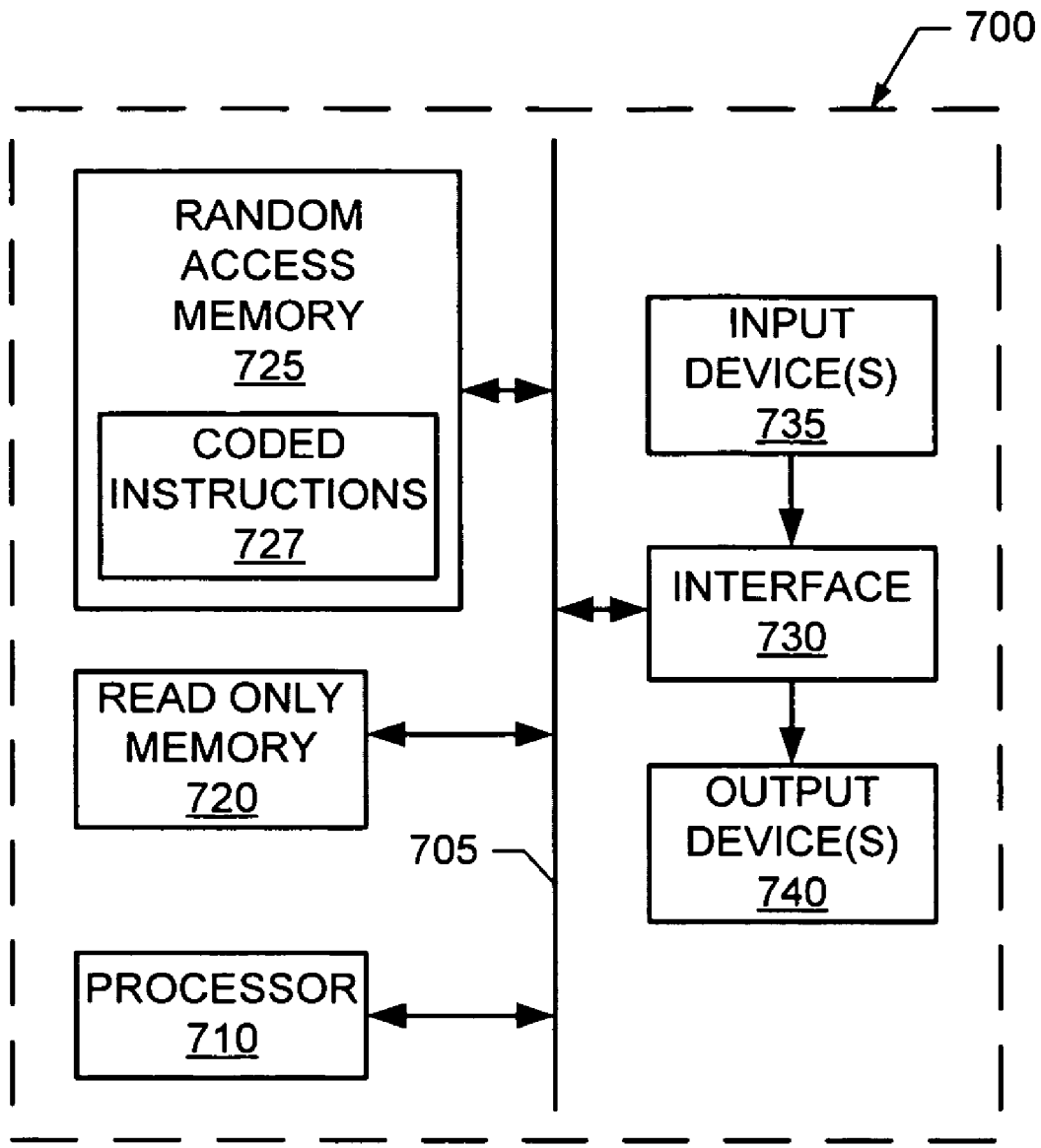
FIG. 7 is a schematic illustration of an example processor platform that may be used and/or programmed to execute the example machine accessible instructions illustrated in FIG. 4 to implement the example graph mapper of FIG. 1.

FIG. 7 is a schematic diagram of an example processor platform 700 that may be used and/or programmed to implement the example communication profiler 110, the example tracing tool 115, the example graph mapper 125, the example network profiler 130 and/or the example performance profiler of FIG. 1. For example, the processor platform 700 can be implemented by one or more general purpose processors, cores, microcontrollers, etc.

The processor platform 700 of the example of FIG. 7 includes a general purpose programmable processor 710. The processor 710 executes coded instructions 727 present in main memory of the processor 710 (e.g., within a RAM 725). The processor 710 may be any type of processing unit, such as a processor from the Intel® families of processors. The processor 710 may execute, among other things, the example machine accessible instructions of FIG. 4 to implement the example graph mapper 125 of FIG. 1.

The processor 710 is in communication with the main memory (including a read only memory (ROM) 720 and the RAM 725) via a bus 705. The RAM 725 may be implemented by dynamic random access memory (DRAM), Synchronous DRAM (SDRAM), and/or any other type of RAM device, and ROM may be implemented by flash memory and/or any other desired type of memory device. Access to the memory 720 and 725 is typically controlled by a memory controller (not shown) in a conventional manner. The RAM 725 may be used to store, for example, the example communication graph 120 and/or the example topology graph 135.

The processor platform 700 also includes a conventional interface circuit 730. The interface circuit 730 may be implemented by any type of well-known interface standard, such as an external memory interface, serial port, general purpose input/output, etc.

One or more input devices 735 and one or more output devices 740 are connected to the interface circuit 730. For example, the input devices 735 may be used to provide and/or output the example mapping data 140.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A computer implemented method comprising:
    determining a mapping between a communication graph representative of communications of a distributed application and a topology graph representative of communication costs associated with a computing network;
    determining a size of the communication graph;
    determining a size of the topology graph;
    inserting a dummy vertex into the communication graph if the size of the communication graph is smaller than the size of the topology graph;
    inserting a dummy vertex into the topology graph if the size of the topology graph is smaller than the size of the communication graph; and
    executing the distributed application with processes of the distributed application assigned to computing nodes of the computing network based upon the mapping.

2. A method as defined in claim 1, wherein the communications represent at least one of a number of bytes transmitted, a number of messages transmitted, a message delay, or a message latency between pairs of processes of the distributed application.

3. A method as defined in claim 1, further comprising profiling the distributed application to determine the communication graph.

4. A method as defined in claim 3, wherein the profiling is done while the distributed application is executing.

5. A method as defined in claim 3, further comprising using at least one of a trace collector or a messaging passing interface (MPI) library to profile the distributed application.

6. A method as defined in claim 1, wherein the communication costs represent at least one of a bandwidth or a latency between pairs of processing entities of the computing network.

7. A method as defined in claim 6, further comprising using at least one of a messaging passing interface (MPI) parallel ping-pong tool, a trace collector, or an MPI library to measure the at least one of the bandwidth or the latency.

8. A method as defined in claim 1, further comprising:
creating an initial mapping of the communication graph to the topology graph;
calculating a cost associated with the initial mapping; and
changing a component of the initial mapping if the change results in a lower cost associated with the changed mapping.

9. A method as defined in claim 8, further comprising changing a component of the changed mapping if the change results in a lower cost.

10. A method as defined in claim 8, wherein changing a component of the initial mapping switches a mapping of a first process and a second process.

11. A method as defined in claim 8, wherein a cost associating with a particular mapping of the communication graph to the topology graph is a function of costs associating a plurality of mappings of two processes of the distributed application to two processing entities of the computing network that form the mapping.

12. A method as defined in claim 11, wherein a cost associated with a mapping of two processes of the distributed application to two processing entities of the computing network is computed by multiplying a first number representative of an amount of communications between the two processes with a second number representative of a communication cost between the two processing entities.

13. An apparatus comprising:
a memory to store a communication graph representative of communication requirements for a distributed application, and to store a topology graph representative of communication costs associated with a computing network; and
a graph mapper to:
assign processes of the distributed application to processing entities of the computing network by mapping the communication graph to the topology graph to minimize a cost associated with the mapping;
determine a size of the communication graph;
determine a size of the topology graph;
insert a dummy vertex into the communication graph if the size of the communication graph is smaller than the size of the topology graph; and
insert a dummy vertex into the topology graph if the size of the topology graph is smaller than the size of the communication graph.

14. An apparatus as defined in claim 13, further comprising:
a communication profiler to determine the communication graph; and
a network profiler to determine the topology graph.

15. An apparatus as defined in claim 13, further comprising a performance profiler to measure the performance of the distributed application.

16. An apparatus as defined in claim 13, wherein the communications requirements represent at least one of a number of bytes or a number of messages transmitted between pairs of processes of the distributed application.

17. An apparatus as defined in claim 13, wherein the communication profiler uses at least one of a trace collector or a messaging passing interface (MPI) library to profile the distributed application, and the distributed application is profiled while the distributed application is executing.

18. An apparatus as defined in claim 13, wherein the communication costs represent at least one of a bandwidth or a latency between pairs of processing entities of the computing network.

19. An apparatus as defined in claim 18, wherein the network profiler uses a messaging passing interface (MPI) parallel ping-pong tool to measure the at least one of the bandwidth or the latency.

20. An apparatus as defined in claim 13, wherein the graph mapper is configured to:
create an initial mapping of the communication graph to the topology graph;
calculate a cost associated with the initial mapping; and
change a component of the initial mapping if the change results in a lower cost associated with the changed mapping.

21. An apparatus as defined in claim 20, wherein changing a component of the initial mapping switches a mapping of a first process and a second process.

22. An apparatus as defined in claim 20, wherein a cost associating with a particular mapping of the communication graph to the topology graph is a sum of costs associated with a plurality of mappings of two processes of the distributed application to two processing entities of the computing network that form the mapping, and a cost associated with a mapping of two processes of the distributed application to two processing entities of the computing network is computed by multiplying a first number representative of an amount of a communication requirement between the two processes with a second number representative of a communication cost between the two processing entities.

23. An article of manufacture storing machine accessible instructions which, when executed, cause a machine to:
obtain a communication graph for a distributed application;
obtain a topology graph for a computing network;
determine a size of the communication graph;
determine a size of the topology graph;
insert a dummy vertex into the communication graph if the size of the communication graph is smaller than the size of the topology graph;
insert a dummy vertex into the topology graph if the size of the topology graph is smaller than the size of the communication graph; and
iteratively and randomly map the communication graph to the topology graph to select a process-to-node map to reduce an overall communication cost of the distributed application when executed on the computing network, wherein randomly mapping increases the likelihood of an overall communication cost minimum.

24. An article of manufacture as defined in claim 23, wherein the machine accessible instructions, when executed, cause the machine to execute the distributed application on the computing network based on the selected process-to-node map.

25. An article of manufacture as defined in claim 23, wherein the machine accessible instructions, when executed, cause the machine to profile the distributed application to determine the communication graph.

26. An article of manufacture as defined in claim 25, wherein the profiling is done while the distributed application is executing.

27. An article of manufacture as defined in claim 23, wherein the machine accessible instructions, when executed, cause the machine to iteratively map the communication graph to the topology graph to select a process-to-node map by:

creating an initial mapping of the communication graph to the topology graph;

calculating a cost associated with the initial mapping; and changing a component of the initial mapping if the change results in a lower cost associated with the changed mapping.

* * * * *